Feb. 12, 1952     C. P. SPAULDING     2,585,868
SECTOR SCANNING RADAR DEVICE
Filed Aug. 20, 1945     2 SHEETS—SHEET 1

INVENTOR
CARL PHILIP SPAULDING
BY
ATTORNEY

Feb. 12, 1952            C. P. SPAULDING            2,585,868
SECTOR SCANNING RADAR DEVICE
Filed Aug. 20, 1945            2 SHEETS—SHEET 2
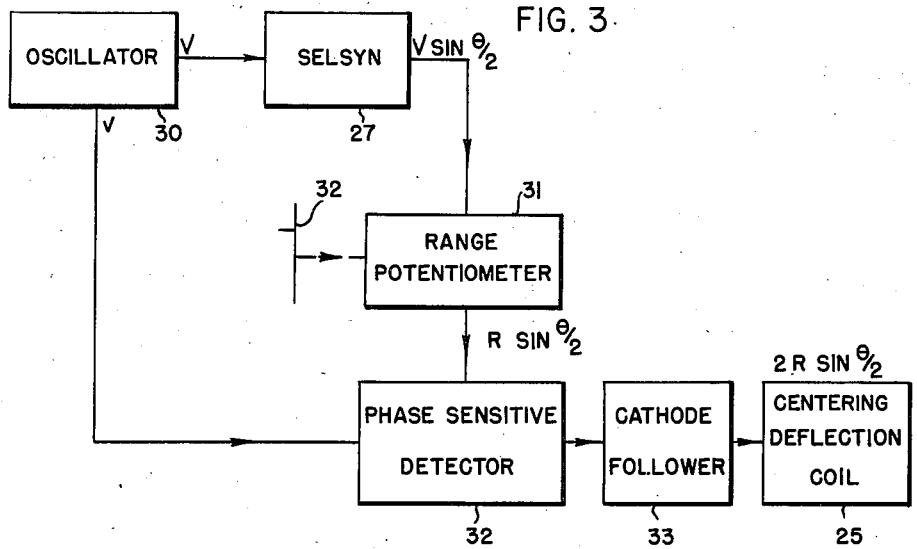
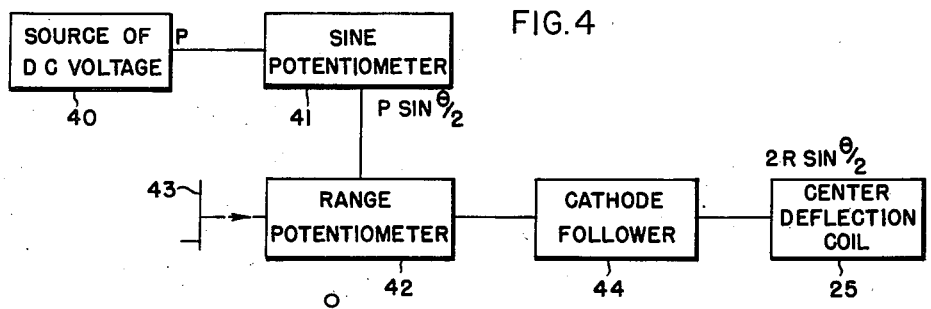
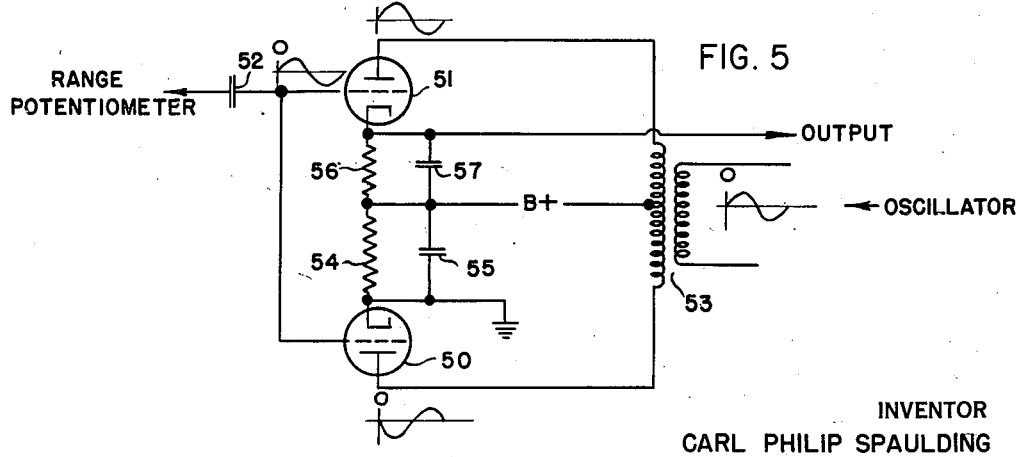
INVENTOR
CARL PHILIP SPAULDING
BY
ATTORNEY Patented Feb. 12, 1952

2,585,868

UNITED STATES PATENT OFFICE 2,585,868

SECTOR SCANNING RADAR DEVICE

Carl Philip Spaulding, Cambridge, Mass., assignor, by mesne assignments, to the United States of America as represented by the Secretary of War Application August 20, 1945, Serial No. 611,645

14 Claims. (Cl. 343—11)

This invention relates in general to cathode ray tube sweep circuits and more particularly to such circuits giving a sector type of scan.

In some types of radio object-locating systems, a rotatable transmitting antenna periodically radiates pulses of electromagnetic energy out into space. If one of these pulses strikes a material having a dielectric constant differing from that of air, a portion of this electromagnetic energy will be reflected back from said material to the antenna. If this antenna also is made to act as a receiving antenna, which is often the case, the "echo" pulse may be detected, and its time phase may be compared with the time phase of the original pulse, called the reference pulse, sent out from the antenna. The time difference between the echo pulse and the reference pulse will be a measure of the distance of the reflecting object from the antenna, since the velocity of electromagnetic waves in space is known. It is desirable that the reference pulse and echo pulse be made to show on the face of a cathode ray tube in their correct time relationships, in order that the range may be determined visually.

For some purposes, it is desirable to search only a small sector of the possible 360° of space available to the rotatable antenna. A conventional type of cathode ray tube sweep used with 360° search is one in which the sweep starts from the center of the tube and sweeps outwardly in a direction corresponding to the direction the antenna is pointing at that instant. Thus as the antenna rotates the picture displayed on the face of the tube will be one of polar coordinates of azimuth angle and range, with the antenna at the center of the pattern. So-called sector scan takes a small sector of this total indication, and amplifies it so that it occupies a large portion of the screen, this chosen sector being the only display that is allowed to show up on the face of the tube.

Among the objects of the present invention, therefore, are:

1. To provide the sweep circuits for a cathode ray tube associated with the abovementioned type of radio object-locating system; and 2. To provide such circuits as will cause a sector of space to be represented on the face of the cathode ray tube.

In accordance with the present invention there is provided a cathode ray tube using two magnetic deflecting coils, the apparatus to be used with the aforementioned type of radio object-locating system. One of the coils rotates at the speed of the rotating antenna, and the other rotates at half the antenna speed, with the axes of the two coils being initially at right angles at the start of the scan. The sweep current applied to the coil rotating at the speed of the antenna is linear, while the sweep current applied to the coil rotating at half the antenna speed is proportional to sin $(\theta/2)$, where $\theta/2$ is the angle of this coil from its rest or initial position. Apparatus is provided whereby this type of sector scan is accomplished.

This invention will best be understood by reference to the drawings, in which:

Fig. 3 is a block diagram of one embodiment of the sweep circuits involved in the presentation of Fig. 1;

Fig. 4 is a block diagram of another embodiment of the sweep circuits involved in the presentation of Fig. 1; and Fig. 5 is a schematic diagram of a phase sensitive detector which may be used in the circuit of Fig. 3.

Figure 1:
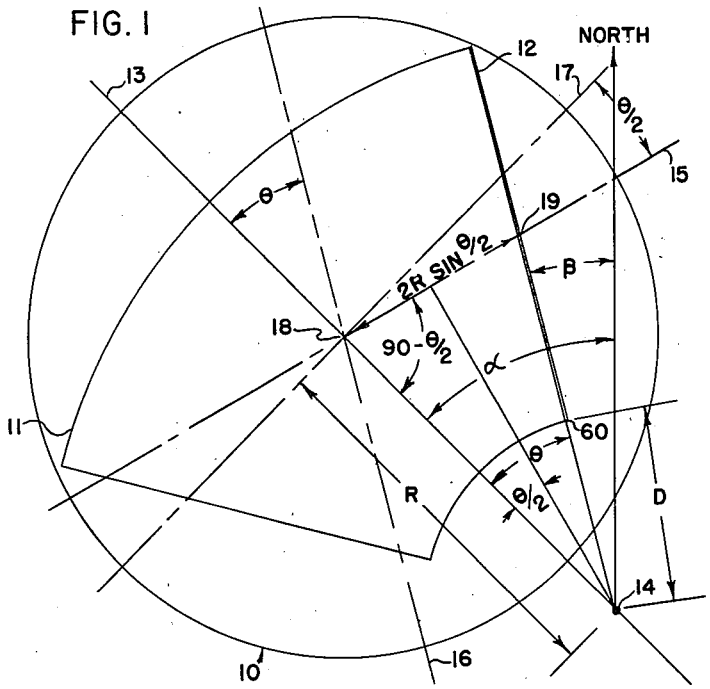
Fig. 1 shows the geometry involved in a sector type of scan according to the present invention.

Referring now to a description of the apparatus and to Fig. 1, there is represented the outline of the cathode ray tube screen 10 upon which is superimposed the outline of the sector display 11. The trace at the particular time illustrated is in a position 12. The axis of the sector is represented by line 13, with the center of curvature 14 of the curved edges of the sector being at some point remote from the center of the screen. The centerline of the deflection coil which rotates at half the antenna speed, called the centering deflection coil, is represented as 15, while the centerline of the deflection coil rotating at the antenna speed, called the range sweep deflection coil, is represented as 16. North or some other reference position has the direction noted. Thus the axis 13 of the sector display is at a constant angle alpha from north, and the tube trace 12 is at a varying angle beta from north. Centerline 16 of the range sweep deflection coil is shown at an angle $\theta$ from the sector axis 13, while centerline 15 of the centering deflection coil is shown at an angle $\theta/2$ from a perpendicular 17 to the sector axis.

Figure 2:
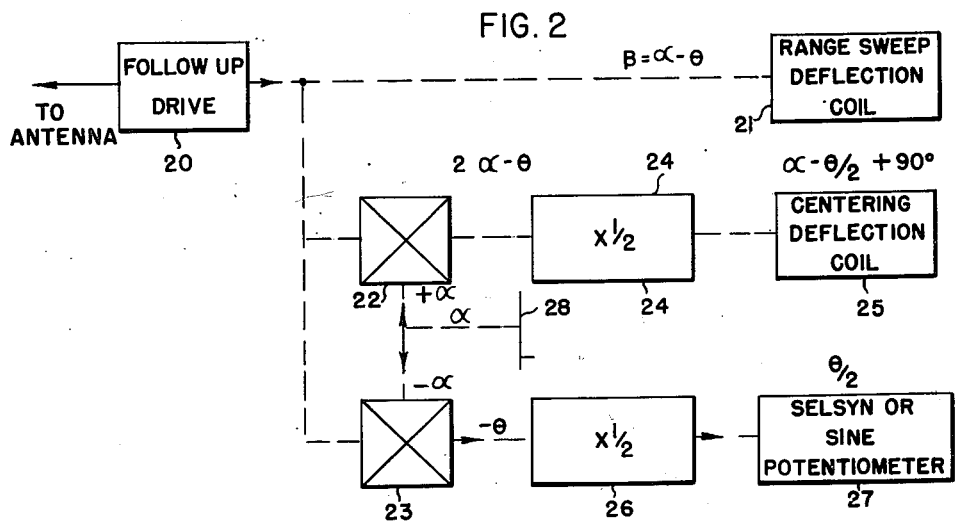
Fig. 2 is a block diagram of the system used to transfer the motion of the antenna to the deflection coils.

Fig. 2 is a block diagram of the system used to project the motion of the antenna back to the deflection coils, and to the sweep circuit for the centering deflection coil. The antenna, not shown, is coupled into a follow-up (servo) drive system 20, the output of which may be north-stabilized, and is coupled directly to the range sweep deflection coil 21, and into two differentials 22 and 23. In all these figures, dashed lines represent mechanical connections, and solid lines represent electrical connections. Azimuth position selector handle 28 adds the angle alpha, the angle of the sector axis from north, to the motion of differential 22, and subtracts it from the motion of differential 23. The output of differential 22 is sent through a gearing reduction system 24 which has a 2:1 ratio, and is coupled into the centering deflection coil 25. The axis of this coil is initially set so that it is at an angle of 90° with respect to the angle that the gearing system 24 has turned from the antenna direction. The output of differential 23 is fed through a gearing reduction system 26 having a 2:1 ratio which provides an output of $\theta/2$, and which is sent to a selsyn or sine potentiometer 27, electrically connected into the sweep circuit (Fig. 3).

Fig. 3 is a block diagram of one embodiment of a sweep circuit used to give the display of Fig. 1. An oscillator 30 feeds the rotor of the selsyn 27 shown in Fig. 2. The stator of this selsyn is connected to the range potentiometer 31, which has its ratio adjusted by the range delay selector 32. The output of the range potentiometer 31, together with the output of the oscillator 30, are fed into a phase sensitive detector 32. The output of detector 32 is fed through a cathode follower 33 to the centering deflection coil 25.

Fig. 4 is a block diagram of another embodiment of a sweep circuit used to give the display of Fig. 1. A source of D. C. voltage 40 is connected across a sine potentiometer 41. A sine potentiometer is one which may have its windings arranged in a circular manner and having the winding card of a sinusoidal shape so that the output is substantially equal to the sine of the input. This voltage is grounded at some intermediate value which lies between the two extremes of voltage from this source, so that the voltage from this source is positive at one extreme and negative at the other extreme with respect to ground. The shaft of this potentiometer is turned so that it is at an angle of $\theta/2$ from the direction of north, as is shown in Fig. 2. The output of the sine potentiometer 41 is thus proportional to the sine of $\theta/2$, and is connected across a range potentiometer 42, similar to the range potentiometer 31 shown in Fig. 3. A handle 43 which is set according to the range delay D chosen, is similar to the device of Fig. 3. A cathode follower 44 is used to couple the range potentiometer 42 to the centering deflection coil 25 to provide a low impedance output for the coil.

Fig. 5 is a circuit diagram of one possible embodiment of a phase sensitive detector which may be used with the circuit of Fig. 3. The output of the range potentiometer 31, Fig. 3, as noted, is coupled through condenser 52 into the grids of the two tubes 50 and 51 in phase. The output of the oscillator 30, Fig. 3, as noted, is fed into the primary winding of transformer 53. One end of the secondary winding of transformer 53 is connected to the plate of tube 51, and the other end is connected to the plate of tube 50. In the cathode circuit of tube 50 is a parallel network of resistor 54 and condenser 55. In the cathode circuit of tube 51 is a parallel network of resistor 56 and condenser 57. The plate supply voltage is connected from the center tap of the secondary of transformer 53 to the connecting point of resistors 54 and 56. The cathode of tube 50 is grounded, while the output is taken from the cathode of tube 51.

Referring now to the operation of the apparatus and to Fig. 1, it is seen that the center of curvature 14 of the sector is displaced from the center of the screen in order to provide more visual amplification of the display. While the centerline 16 of the range sweep deflection coil has moved clockwise through an angle $\theta$ from its original position, that of axis 13, the centerline 15 of the centering deflection coil moves clockwise through an angle $\theta/2$ from its original position 17. In general the axis 13 of the sector will be at an angle alpha from the arbitrary zero direction, which will be taken as north in this case. Since the angle alpha was chosen to be in a counterclockwise direction from north, the trace 12 on the screen will be at an angle beta=alpha$-\theta$, if the absolute values of both angles are used. Beta will always be measured in a counterclockwise direction from north in this case.

Into the range sweep deflection coil there is coupled a current which is increasing linearly, starting the trace at point 14. The trace will be seen on the screen at a point 60, however, point 60 being at a time delay D from point 14. This delay period may be chosen so that the whole of the outline of the sector 11 will fall on the screen of the tube. The distance from the center 18 of the screen, which is made to be substantially in the same position as the geometrical center of the sector, to the center of curvature 14 of the sector will be called R. The angle between the centerline 15 of the centering deflection coil at the present instant and the axis 13 of the sector is 90$-\theta/2$, since the axis of the centering deflection coil and the axis of the range sweep deflection coil are initially at right angles at zero time. Since the small acute angle in the triangle whose vertices are 14, 18 and 19 is $\theta$, the third angle in this triangle is 90$-\theta/2$, and this triangle is isosceles. $\theta$ may be divided into two equal angles, each $\theta/2$, which divides the triangle whose vertices are 14, 18 and 19 into two right triangles. The length of the base of this isosceles triangle opposite the angle $\theta$ is therefore $2R \sin (\theta/2)$, and the sweep current in the centering deflection coil must be proportional to $2R \sin (\theta/2)$ at any instant.

The motion of the deflection coils is controlled by the apparatus shown in Fig. 2. In this figure, the angular positions of the devices from north are noted in appropriate places. If north-stabilized antenna motion comes from the follow-up drive 20, the output shaft of this drive is at an angle beta=alpha$-\theta$ and is coupled directly to the range sweep deflection coil 21. The axis of this coil is along line 16 in Fig. 1, and is, of course, parallel to the trace 12 on the face of the tube. This north-stabilized motion is also coupled to two differentials 22 and 23. By means of a crank 28, the angle alpha is mechanically added to the angle beta=alpha$-\theta$ in differential 22, and so the output of this differential will be 2 alpha$-\theta$. This angular motion is now sent through a reduction gearing system 24 with a ratio of 2:1. The output of this system, which will then be at an angle of alpha$-\theta/2$, is mechanically coupled to the centering deflection coil 25.

As is seen in Fig. 1, a rotation of 90° must be added to this motion, so the axis 15 of the centering deflection coil will be at an angle alpha—θ/2+90 from north. Crank 28 also mechanically adds an angle (—alpha) to the angular motion beta=alpha—θ of the follow-up drive 20 which is coupled into differential 23, and so the output of this differential will be the angle (—θ). This angular motion is sent through a gearing reduction system 26 of ratio 2:1, the angular output of which will be θ/2, and which controls the motion of a selsyn or of a sine potentiometer 27 used in the sweep circuits, shown in Fig. 3, and in Fig. 4.

Referring now to Fig. 3, which is a block diagram of one embodiment of the sweep circuits for the centering deflection coil, a low-frequency oscillator 30 has its output sent to the rotor of selsyn 27, Fig. 2. This selsyn is set so that at its rest position the maximum voltage is induced in the stator from the rotor. Hence, since the selsyn has turned through an angle of θ/2, the output will be proportional to sin (θ/2). This voltage is then put across the range potentiometer 31, and a portion of it is taken from the output of this potentiometer, which is made to be proportional to R sin (θ/2). The crank 32 controls the ratio of the potentiometer 31, and can be calibrated as to range delay D (see Fig. 1), which is dependent upon the total distance R. Detector 32 must be a phase sensitive detector, since currents proportional to R sin (θ/2) and —R sin (θ/2) must be provided, in order that the trace be able to fall on both sides of centerline 13, Fig. 1.

The phase sensitive detector shown schematically in Fig. 5 provides either a positive or a negative output voltage, depending upon the amplitude of the signal from the range potentiometer. Representative waveforms are shown on the figure at the primary to transformer 53, at the grids of the two tubes, and at the plates of the two tubes. The reference or zero time for all of these waveforms is the same, and is marked as such. It is seen that, due to the action of the transformer, the wave on the plate of tube 50 is 180° out of phase with the wave on the plate of tube 51, the voltage variation on the plate of tube 51 being in phase with the variation at the primary of transformer 53. Since the range potentiometer output voltage comes from the oscillator, the voltage wave on the grid of the tubes will be in phase with the variation at the primary of transformer 53.

With the polarity of transformer 53 causing the phase of the various waveforms as shown, it is seen that during the first half of the cycle the current in tube 51 will be very much greater than that in tube 50, while during the last half of the cycle represented the current in tube 50 will be slightly greater than the current in tube 51. Resistor 56 is chosen so that it is of a lesser size than resistor 54, so that the output of the range potentiometer will be such that when the antenna is at an angle alpha from north (see Fig. 1) the output voltage of the circuit of Fig. 5 will be substantially zero. It can furthermore be seen that an increase in the voltage from the range potentiometer beyond this zero point will produce a positive output voltage, while a decrease in range potentiometer voltage will provide a negative output voltage.

The output of the detector 32 is sent through a cathode follower 33 to provide a low impedance output to the centering deflection coil 25. The amplification of the output from the range potentiometer 31 to the centering deflection coil 25 is such that the coil current will be proportional to 2R sin (θ/2).

Some sort of switching circuit must be provided, usually at the cathode or grid of the cathode ray tube, to allow the trace to be visible only during the time the trace is between the limits of beta and beta+2θ from the north reference direction. This circuit, called a blanking or gating circuit, may take the form of a square wave generator, such as a multivibrator or an overdriven amplifier. The gate must be synchronized with the motion of the antenna, which may be accomplished by providing a switch which rotates with the antenna. If a multivibrator is used, this switch will trigger it, and if an overdriven amplifier is used, the switch will turn on the plate voltage of the tubes.

Referring now to Fig. 4, let us assume that the source of D. C. voltage 40 has an output voltage P. The sine potentiometer 41 effectively multiplies this voltage by the sine of half the antenna rotation angle, and so the output is P sin (θ/2). The range potentiometer 42 effectively multiplies this value by an amount which causes the output to be dependent upon the distance R, Fig. 2. The output of the range potentiometer 42 is connected to the centering deflection coil 25 through a cathode follower 44. The ratio of the range potentiometer 42 and the amplification of the cathode follower 44 are such that the current in the centering deflection coil is proportional to 2R sin (θ/2).

When the sector embraces only a very small angle of space θ, it is possible to use a linear potentiometer in the place of sine potentiometer 41. This system will then use the approximation sin(θ/2)=θ/2, which is good enough for small values of θ/2.

While there has been described what is at present considered the preferred embodiment of the invention, it will be obvious to those skilled in the art that various changes and modifications may be made therein without departing from the invention, and it is, therefore, aimed in the appended claims to cover all such changes and moifications as fall within the true spirit and scope of the invention.

I claim:

1. In a radio object-locating system using sector scan, a rotatable antenna having a reference direction, a cathode ray tube employing two sets of rotating deflection coils, the angular speed of the first set of coils being substantially the same as the antenna speed, the angular speed of the second set of coils being substantially half the antenna speed, a linear sweep circuit feeding said first set of coils, a sweep circuit feeding said second set of coils comprising a source of electric energy, a sinusoidal current generating means connected to said electrical source, means coupled to said rotatable antenna and to said sinusoidal generator for controlling the output of said sinusoidal generator whereby said current output is at any instant substantially proportional to the sine of half the angle of the antenna at that instant as measured from said reference direction, and means coupling the output of said sinusoidal current generating means into said second set of deflection coils.

2. In a radio object-locating system using sector display, a rotatable antenna having a reference direction, a cathode ray tube employing two sets of rotating deflection coils, follow-up drive means coupled to said antenna whereby the angular velocity of the first set of coils is substantially equal to the antenna angular velocity, a sawtooth wave sweep circuit applying current to the first set of coils, first and second differential means into which are coupled the output of said follow-up system, crank means coupled to said first and to said second differential means, means causing the output of said first differential means to be dependent upon the position of said follow-up system and the position of said crank means, first reduction gearing means having a 2:1 ratio and into which is coupled the output of said first differential means, means coupling the output of said first reduction gearing means to said second set of coils, whereby the angular velocity of said second set of coils is substantially half the angular velocity of said antenna, a sweep circuit for transferring current into said second set of coils comprising an oscillator, a selsyn into one winding of which the output of said oscillator is coupled, means whereby the output of said selsyn at any instant is substantially proportional to the sine of half the angle the antenna makes with the reference direction at that instant comprising said second differential means, the output of said second differential means being dependent upon the rotation of said follow-up system and the rotation of said crank means, a second reduction gearing means of ratio 2:1 coupled to the output of said second differential means, and means mechanically coupling the output of said second reduction gearing means to said selsyn means, a range potentiometer into which is fed the output of said selsyn, means causing the output of said range potentiometer at any instant to be substantially proportional to the distance from the center of curvature of said sector to the geometrical center of said sector multiplied by the sine of half the angle the antenna makes with the reference direction at that instant, a phase sensitive detector into which is fed the output of said range potentiometer and the output of said oscillator, means applying the output of said phase sensitive detector into said second set of coils and means causing the current in said second set of coils at any instant to be substantially proportional to twice the distance from the center of curvature of said sector to the geometrical center of said sector multiplied by the sine of half the angle the antenna makes with the reference direction at that instant.

3. In a radio object-locating system using sector display, a rotatable antenna having a reference direction, a cathode ray tube employing two sets of rotating deflection coils, the angular velocity of said first set of coils being substantially the same as the antenna angular velocity, the angular velocity of said second set of coils being substantially half the angular velocity of the antenna, a linear sweep circuit feeding current into said first set of coils, a sweep circuit for feeding current into said second set of coils comprising an oscillator, a selsyn into at least one winding of which the output of said oscillator is coupled, means to cause said selsyn to rotate at substantially half the angular velocity of said antenna, the output of said selsyn at any instant being substantially proportional to the sine of half the angle the antenna makes with the reference direction at that instant, a range potentiometer into which is fed the output of said selsyn, means causing the output of said range potentiometer at any instant to be substantially proportional to the distance from the center of curvature of said sector to the geometrical center of said sector multiplied by the sine of half the angle the antenna makes with the reference direction at that instant, a phase sensitive detector into which is fed the output of said range potentiometer and the output of said oscillator, means coupling the output of said phase sensitive detector into said second set of coils and means causing the current in said second set of coils at any instant to be substantially proportional to twice the distance from the center of curvature of said sector to the geometrical center of said sector multiplied by the sine of half the angle the antenna makes with the reference direction at that instant.

4. In a radio object-locating system using sector display, a rotatable antenna having a reference direction, a cathode ray tube employing two sets of rotating deflection coils, follow-up drive means whereby the angular velocity of the first set of coils is substantially equal to the antenna velocity, a sawtooth wave sweep circuit applying current into said first set of coils, first differential means into which is coupled the output of said follow-up system, first crank means coupled into said first differential means, means causing the output of said first differential means to be dependent upon the position of said follow-up system and the position of said first crank means, first reduction gearing means having a 2:1 ratio into which is coupled the output of said first differential means, means mechanically coupling the output of said first reduction gearing means to said second set of coils, whereby the angular velocity of said second set of coils is substantially equal to half the angular velocity of said antenna, a sweep circuit for feeding current into said second set of coils comprising a source of D. C. potential, a sine potentiometer across which the output of said source of D. C. potential is connected, the shape of said sine potentiometer being such that the output is substantially proportional to the sine of the input, means to cause said sine potentiometer to rotate at substantially half the angular velocity of said antenna comprising a second differential means coupled to said follow-up drive means, said first crank means coupled to said second differential means, whereby the output angle of said second differential means at any instant is dependent upon the position of said follow-up drive means and the position of said first crank means, second reduction gearing means having a 2:1 ratio and coupled to said second differential means, and means coupling said second reduction gearing means to said sine potentiometer, a range potentiometer connected across the output of said sine potentiometer, second crank means coupled to said range potentiometer, whereby the output voltage of said range potentiometer is dependent upon the position of said second crank means, means causing the output of said range potentiometer at any instant to be substantially proportional to the distance from the center of curvature of said sector to the geometrical center of said sector multiplied by the sine of half the angle the antenna makes with the reference direction at that instant, means feeding the output of said range potentiometer into said second set of coils and means causing the current in said second set of coils at any instant to be substantially proportional to twice the distance from the center of curvature of said sector to the geometrical center of said sector multiplied by the sine of half the angle the antenna makes with the reference direction at that instant.

5. In a radio object-locating system using sector display, a rotatable antenna having a reference direction, a cathode ray tube employing two sets of rotating deflection coils, the angular velocity of the first set of coils being substantially the same as the antenna angular velocity, the angular velocity of the second set of coils being substantially half the angular velocity of the antenna, a sawtooth wave sweep circuit for feeding current into said first set of coils, a sweep circuit for applying current to said second set of coils comprising a source of electrical potential, a sine potentiometer across which the output of said electrical source is connected, the shape of said sine potentiometer being such that the output is substantially proportional to the sine of the input, means to cause said sine potentiometer to rotate at substantially half the angular velocity of said antenna, means causing the output of said sine potentiometer at any instant to be substantially proportional to the sine of half the angle the antenna makes with the reference direction at that instant multiplied by the distance from the center of curvature of said sector to the geometrical center of said sector, a range potentiometer into which is fed the output of said sine potentiometer, crank means coupled to said range potentiometer, whereby the output of said range potentiometer is dependent upon the output of said sine potentiometer and the position of said crank means, means applying the output of said range potentiometer into said second set of coils and means causing the current in said second set of coils at any instant to be substantially proportional to twice the distance from the center of curvature of said sector to the geometrical center of said sector multiplied by the sine of half the angle the antenna makes with the reference direction at that instant.

6. In a radio object-locating system comprising a rotatable antenna having a reference direction, and a cathode ray tube employing two sets of rotating deflection coils, the angular speed of the first set of coils being substantially the same as the antenna speed, the angular speed of the second set of coils being substantially half the antenna speed, a method of sector scan comprising the steps of acting on the electron beam of said cathode ray tube with two forces, the first force at any instant being substantially proportional to the sine of half the angle of said rotatable antenna from said reference direction at that instant and being applied in a direction which is substantially half of the angle of said rotatable antenna from said reference direction different from a direction perpendicular to said reference direction, the second force being linearly increasing and being applied in a direction which is substantially the same as the direction of said antenna.

7. The method of providing a sector display for a cathode ray tube producing an electron beam, comprising generating a linearly varying deflecting force, deflecting said electron beam with said linearly varying force, rotating the direction of application of said linearly varying force about the central axis of said cathode ray tube at a given speed, generating a sinusoidal deflecting force, deflecting said electron beam with said sinusoidal deflecting force, and rotating the direction of application of said sinusoidal deflecting force about said central axis at a speed different from said given speed.

8. An electronic method of sector display according to claim 7, wherein the initial direction of application of said sinusoidal deflecting force is perpendicular to the initial direction of application of said linearly varying deflecting force, and wherein the direction of application of said sinusoidal deflecting force is rotated about said central axis of said cathode ray tube at one-half the rotational speed of that of said linear deflecting force.

9. A circuit for providing deflecting voltages in a sector scan indicator, comprising a first deflection coil, means for rotating said first coil at a given speed, a second deflection coil having its electromagnetic axis originally at right angles to that of said first coil, means for rotating said second coil at half said given speed, first means for supplying to said first coil a sweep current varying in accordance with a linear saw-tooth, and a second means for supplying to said second coil a sweep current varying in proportion to sine $\theta/2$, where $\theta$ is the angle of the axis of said first coil at a given instant with respect to the original position thereof.

10. A system for providing deflecting voltages in a cathode ray tube sector display indicator, comprising first and second deflecting means positioned to act on the electron beam of said indicator, a sinusoidal current source connected to the first of said deflecting means, a linearly increasing current source connected to the second of said deflecting means, and means connected to said first and second deflecting means respectively for rotating them about the central axis of said cathode ray tube at differing speeds.

11. In a radio object locating system including an antenna rotatable at a given speed and a cathode ray tube display, the method of effecting a sector display on said tube comprising generating respective linearly and sinusoidally varying deflecting forces for deflecting the electron beam of said cathode ray tube, rotating about the central axis of said cathode ray tube the direction of application of said linear deflecting force at the antenna rotational speed; and, starting from a position perpendicular to the initial direction of application of said linear force, rotating the direction of application of said sinusoidal deflecting force in the same direction as said linear deflection force at half said antenna rotational speed.

12. In a radio object locating system, including an antenna rotatable at a given speed and having a reference direction, and a cathode ray tube display, the method of effecting a sector display on said tube comprising generating a linearly varying beam deflecting force; generating a sinusoidally varying beam deflecting force proportional to the sine of half the angle of said rotatable antenna in respect to said reference direction at each given instant; starting from the antenna reference direction, rotating about the central axis of said cathode ray tube the direction of application of said linear deflection force at the antenna rotational speed; and starting in a direction perpendicular to said antenna reference direction, rotating about said central axis of said cathode ray tube the direction of application of said sinusoidal deflection force at half the antenna rotational speed, and in the same direction as the rotation of said linear deflecting force.

13. In a radio object locating system including a rotatable antenna having a given rotational frequency, apparatus for effecting a sector display comprising a cathode ray tube, a first rotatable deflection coil for said cathode ray tube, first means for spinning said deflection coil at the antenna rotational speed in synchronism therewith, and a second rotatable deflection coil for said cathode ray tube, and second means synchronized with said antenna for spinning said second deflection coil at a speed differing from said antenna rotational speed.

14. In a radio object location comprising the transmission of pulses of radiant energy to a reflecting object, the reception of echoes therefrom, and the display of said echoes on a cathode ray tube, the method for effecting a sector display on said tube comprising generating respective sinusoidal and linearly varying beam deflecting component forces, deflecting with said forces the electron beam of said cathode ray tube, rotating said linearly varying force about the central axis of said cathode ray tube at a given speed, and rotating said sinusoidal force about the central axis of said cathode ray tube at a speed differing from said given speed to provide a sector display presentation wherein the zero time base of said display which corresponds to the times of said transmission of pulses, is expanded to form the arc of a circle.

CARL PHILIP SPAULDING.

REFERENCES CITED

The following references are of record in the file of this patent:

UNITED STATES PATENTS

| Number | Name | Date |
|---|---|---|
| 2,395,966 | Goldberg | Mar. 5, 1946 |
| 2,421,747 | Engelhardt | June 10, 1947 |
| 2,440,250 | Deloraine | Apr. 27, 1948 |